United States Patent [19]

White

[11] Patent Number: 4,628,469

[45] Date of Patent: Dec. 9, 1986

[54] METHOD AND APPARATUS FOR LOCATING CENTER OF REFERENCE PULSE IN A MEASUREMENT SYSTEM

[75] Inventor: Steven J. White, Seattle, Wash.

[73] Assignee: Technical Arts Corporation, Seattle, Wash.

[21] Appl. No.: 661,780

[22] Filed: Oct. 17, 1984

Related U.S. Application Data

[60] Division of Ser. No. 426,840, Sep. 29, 1982, Pat. No. 4,498,778, which is a continuation-in-part of Ser. No. 249,131, Mar. 30, 1981, abandoned.

[51] Int. Cl.⁴ .................. G01B 11/24; G02B 26/10
[52] U.S. Cl. .................. 364/560; 356/376; 358/107; 358/903; 364/830
[58] Field of Search .................. 356/1, 371, 375–376, 356/381, 387, 394; 358/103, 139, 903; 364/560, 561, 570, 829, 830, 839, 486, 733, 559, 715

[56] References Cited

U.S. PATENT DOCUMENTS

| | | | |
|---|---|---|---|
| 2,994,822 | 8/1961 | Isley, Jr. | 364/486 |
| 3,004,707 | 10/1961 | Wilson | 364/839 |
| 3,723,713 | 3/1973 | Banner et al. | 364/570 |
| 3,803,394 | 4/1974 | Fraser | 364/830 |
| 3,895,870 | 7/1975 | Cullen et al. | 356/1 |
| 3,947,130 | 3/1976 | Procter | 356/387 |
| 4,017,721 | 4/1977 | Michaud | 358/903 |
| 4,041,286 | 8/1977 | Sanford | 358/193 |
| 4,086,656 | 4/1978 | Brown | 364/733 |
| 4,188,544 | 2/1980 | Chasson | 356/376 |
| 4,219,847 | 8/1980 | Pinkney et al. | 364/559 |
| 4,379,308 | 4/1983 | Kosmowski et al. | 356/394 |

OTHER PUBLICATIONS

Moore et al., "Electron Beam Measurement with On'-line Calibration", IBM Tech. Disc. Bull. 6-1979, pp. 104, 105.

Will, P. M. "Optical Encoding of 3-Dimensional Objects", IBM Tech. Disc. Bull. 2-1974, pp. 3117-3118.

Gusev, Y. A. "Method & Circuit for Finding the Coordinate of the Center of a Particle Tract on a Scanning Automation, Instruments & Exp. Techniques," Nov.--Dec. 1975, pp. 1761-1763.

Primary Examiner—Felix D. Gruber
Attorney, Agent, or Firm—Christensen, O'Connor, Johnson & Kindness

[57] ABSTRACT

A method and apparatus are disclosed for determining the spatial coordinates of a workpiece including: a planar light source for illuminating the workpiece; an electronic imaging device adapted to view the intersection of the planar light and the workpiece; pulse signals including pulses representative of said intersections; and a device for determining the centroid of the pulse by integrating the pulse signal over a selected interval including the pulse, integrating the result of the first integration in like manner and dividing the result of the second integration by the result of the first integration.

5 Claims, 12 Drawing Figures

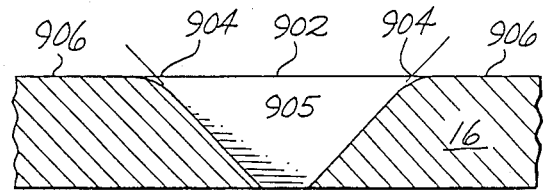
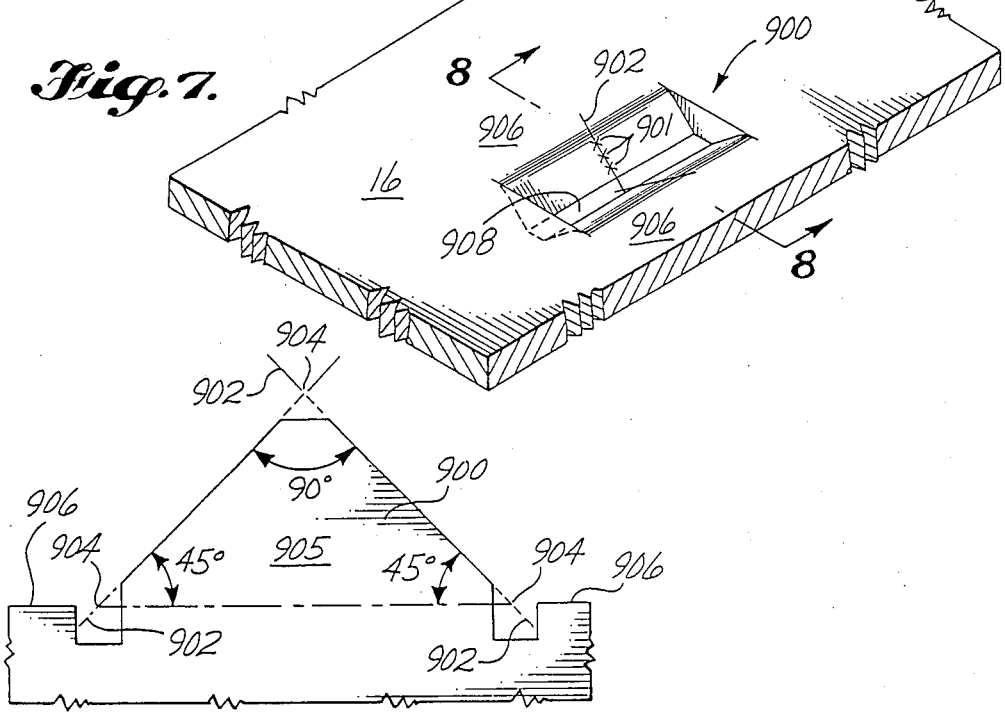
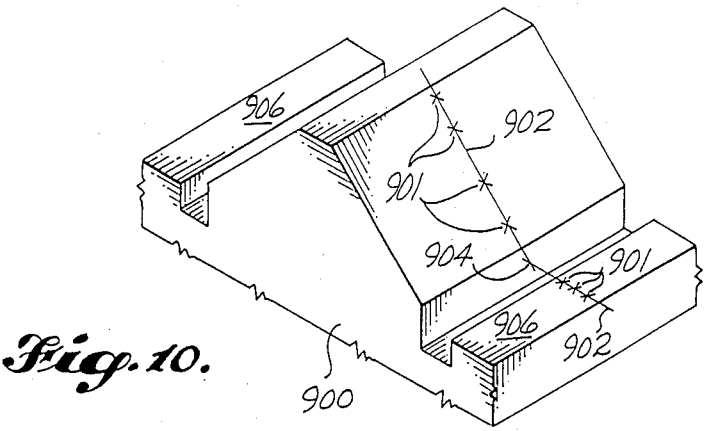

METHOD AND APPARATUS FOR LOCATING CENTER OF REFERENCE PULSE IN A MEASUREMENT SYSTEM

This is a divisional application divided from application Ser. No. 426,840 filed Sept. 29, 1982, now U.S. Pat. No. 4,498,778 as a continuation-in-part of application Ser. No. 249,131, filed Mar. 30, 1981, now abandoned.

DESCRIPTION

1. Field of the Invention

The present invention relates, in general, to an improved method and apparatus for determining the location of a sensed pulse in a measurement system, and further to a method and apparatus for determining, from the location of an opto-electronically sensed pulse, the spatial coordinates of a workpiece within the field of view of an opto-electronic scanning apparatus.

2. Background Art

Apparatus capable of viewing a workpiece, determining its location, and directing equipment to operate upon the workpiece is known. In the past, however, such equipment was often slow and produced results of poor quality due to practical limitations in the cameras and laser scan used. U.S. Pat. No. 4,188,544, for example, discloses equipment designed for use in the lumber industry wherein logs are scanned by projecting a planar light source on a workpiece and detecting the intersection line of the plane of light and the workpiece by means of a television vidicon camera. A calibration technique for modifying the signals generated by the equipment is disclosed wherein a memory unit is used to store calibration information derived by comparing scanning signals of a known three-dimensional reference piece located in the field of view of the camera with previously stored spatial coordinates of the known reference piece. Measurements are made by comparing the workpiece scan with the information derived from the calibration scan. In this prior art system, only the stored spatial coordinates are used for calibration calculations. Thus, the disclosed equipment is limited in its resolution power to the number and accuracy of the stored spatial coordinates and the ability to accurately locate the corresponding spatial coordinates during the calibration scan.

Another system employing a coherent light beam impinged on a workpiece surface and then viewed by a vidicon camera is disclosed in U.S. Pat. Nos. 3,895,870 and 3,796,492. These patents employ either a single punctiform beam and a pair of viewing parts or a single viewing location and a pair of punctiform beams to determine the distance from the camera to the object struck by the beam. In short, the patents merely disclose a distance meter.

U.S. Pat. No. 4,111,557 discloses a method for optically determining and comparing the shapes and positions of objects. Again, objects are viewed by an opto-electronic receiving device and then converted into electric pulses which, after analog-digital conversion, are stored and coordinated with spatial coordinates. The stored data is then compared with the data of an ideal or real object to determine variations in shape or position. This invention does not even attempt to determine spatial coordinates, but merely relates to changes in shape.

U.S. Pat. No. 4,146,926 also employs a punctiform beam and a pair of reflected light-gathering means to explore the surface of a body and determine the location thereof with respect to a reference point.

U.S. Pat. Nos. 4,115,806 and 3,980,812 are considered to be of lesser relevance in that they disclose methods of analyzing electronic images different from that employed in the present invention.

U.S. Pat. No. 4,126,395 discloses a method of determining the location of points on a specular surface having spatial location indicia thereon.

Other prior art systems using noncoherent light sources and photocell sensors are shown in U.S. Pat. Nos. 3,459,246; 3,736,968; 3,787,700; and 3,963,938. U.S. Pat. No. 3,773,422 discloses a system employing a television camera and laser light source for calculating the dimensions of an object using known distances and geometric relationships.

Patents disclosing systems for determining the surface contour of an object by viewing the object at an angle from an illuminating light beam are shown in U.S. Pat. Nos. 3,187,185; 3,590,258; and 3,625,618.

Prior art systems employing television-type sensors and video digitizers have suffered from accuracy problems in determining the location of sensed pulses. While centroid locating systems have been proposed in the past, such as disclosed in U.S. Pat. Nos. 3,803,394; 4,017,721; 4,041,286; and 4,219,847, none uses the method disclosed herein for determining the centroid of a pulse.

SUMMARY OF THE INVENTION

The present invention discloses a method and apparatus for locating the centroid of a pulse and a method and apparatus employing this method for determining the spatial coordinates of a workpiece. The workpiece is illuminated with a source of light. An image of the workpiece, including the line of intersection of the coherent light with the workpiece, is formed using an opto-electronic device such as an image orthicon tube, or the like. The opto-electronic device views the workpiece at a defined angle from the source of coherent light. The intersection of the plane of light and the workpiece produces a reference pulse on each horizontal line of the image orthicon tube. The location of each pulse, including specifically its centroid, is determined as follows.

Referred to generally as the "centroid technique", the signal from the opto-electronic device is sampled and may be digitized. The centroid technique is then performed by: forming a first sum by summing all samples representative of the pulse; forming a second sum by summing the intermediate sums resulting from each sample addition in the immediately preceding sample summing operation; noting the position of the last sample representative of the pulse; subtracting from this position the ratio of the second sum to the first sum to determine the centroid of the pulse. In the preferred form, digital logic circuitry is used although the centroid technique may also be performed using analog integrators.

The spatial coordinates of a workpiece are determined using the centroid of the reference pulses determined as just described together with the angular and distance relationships between the source of light, the workpiece, and the lens of the opto-electronic device determined by a unique method of calibrating the equipment.

The calibration technique employs the placement of a precisely shaped jig in the viewing field of the opto-electronic device. A geometric figure, such as a triangle, typically different in shape than the cross section of the jig, is inherently defined by the jig. The dimensions of the geometric figure, rather than the spatial coordinates of the jig, are effectively stored in an associated computer. The shape of the geometric figure is determined by scanning points along planar surfaces of the jig, connecting lines through those points, and noting the intersections of the lines thus constructed. The intersection points define the corners of the particular geometric figure inherent to the jig. The geometric figure thus constructed in combination with the previously stored dimensions of the figure permits the X, Y, and Z spatial coordinates of a workpiece similarly within the viewing field of the opto-electronic device to be calculated with accuracy. It is preferred that the longitudinal axis of the jig be aligned with the horizontal scan lines of the opto-electronic device, however, perfect alignment is not necessary.

It is the general object of the present invention to provide an apparatus and method for locating the centroid of a reference pulse for providing the spatial coordinates of a workpiece.

One more object is to provide a method and apparatus for determining the centroid of a pulse through the use of relatively inexpensive analog or digital logic circuitry such as adders and without need for costly and time-consuming multiplication processes.

These and other features, objects and advantages of the present invention will become more apparent in light of the detailed description of a preferred embodiment of the invention as set forth hereafter and as illustrated in the accompanying drawings.

BRIEF DESCRIPTION OF THE DRAWINGS

FIG. 7 is a perspective view of a preferred calibration jig formed into the workpiece support surface.

FIG. 8 is a sectional view of the preferred calibration jig of FIG. 7 taken along the line 8—8 of FIG. 7.

FIG. 9 is a side view of a modified version of the jig of FIG. 5.

FIG. 10 is a perspective view of the jig of FIG. 9.

DESCRIPTION OF THE PREFERRED EMBODIMENT

Figure 1:
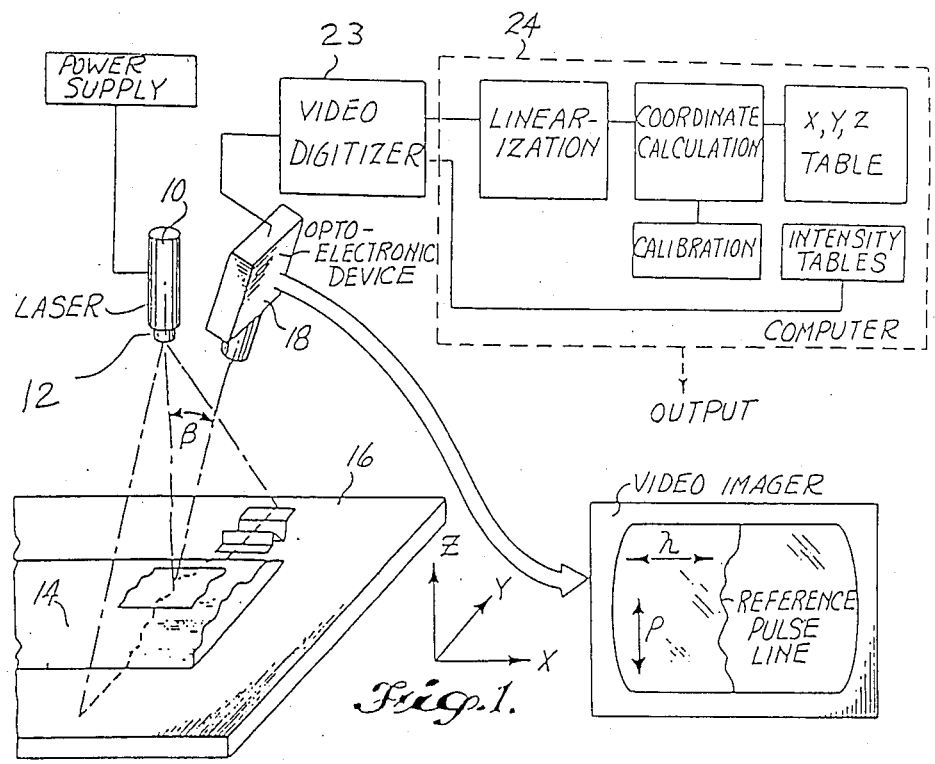
FIG. 1 is a block diagram of one embodiment of a typical apparatus for determining the spatial coordinates of a workpiece.

Referring generally to FIG. 1, a block diagram of one embodiment of a typical apparatus for determining the spatial coordinates of a workpiece is disclosed. A light source of known type, such as a laser or the like having an optical attachment, is used to generate a plane of coherent light which strikes and illuminates a workpiece. As illustrated, the workpiece is shown to be a slab of raw lumber, but it will be understood that the workpiece could be any object whose spatial coordinates are needed to be known in order to allow for accurate measurement, inspection, or processing of the workpiece. Thus, while this invention will be described with specific reference to lumber processing, the equipment is also applicable, without limitation, to industrial control systems, production line inspection, inventory control systems, and medical scanning. Further, the pulse location technique described hereafter may also have wide application outside the lumber-processing area.

An imaging tube, such as an orthicon, vidicon or ultracon, views the workpiece from a known and predetermined viewing angle with respect to the planar light source. The imaging tube produces a plurality of scan lines per raster with each scan line having a reference pulse produced thereon which corresponds to the point at which the scan line intersects the plane of coherent light impinging upon and illuminating the workpiece. If viewed on a video imager such as that shown in FIG. 1, the image produced is a reference pulse line formed by the pulses on each scan line. A video digitizer in communication with the output of the imaging tube samples and digitizes the video signals representative of each scan line, including each reference pulse. The digitizer uses the resulting digitized information to determine the location of each reference pulse, and more particularly, the centroid of each pulse. The spatial coordinates of the workpiece are subsequently determined by a computer which combines this accurate pulse location information with known information, such as the distance of the optical head from a jig of known shape in the field of view of the optical head and other information determined by the calibration technique described hereafter. The spatial coordinates thus determined may be used by other control computers to control external user devices such as lumber-sawing equipment and the like. The user-oriented devices do not form a portion of the present invention but it should be understood that the output of this invention is in a form readily usable by control equipment therefor.

Figure 2:
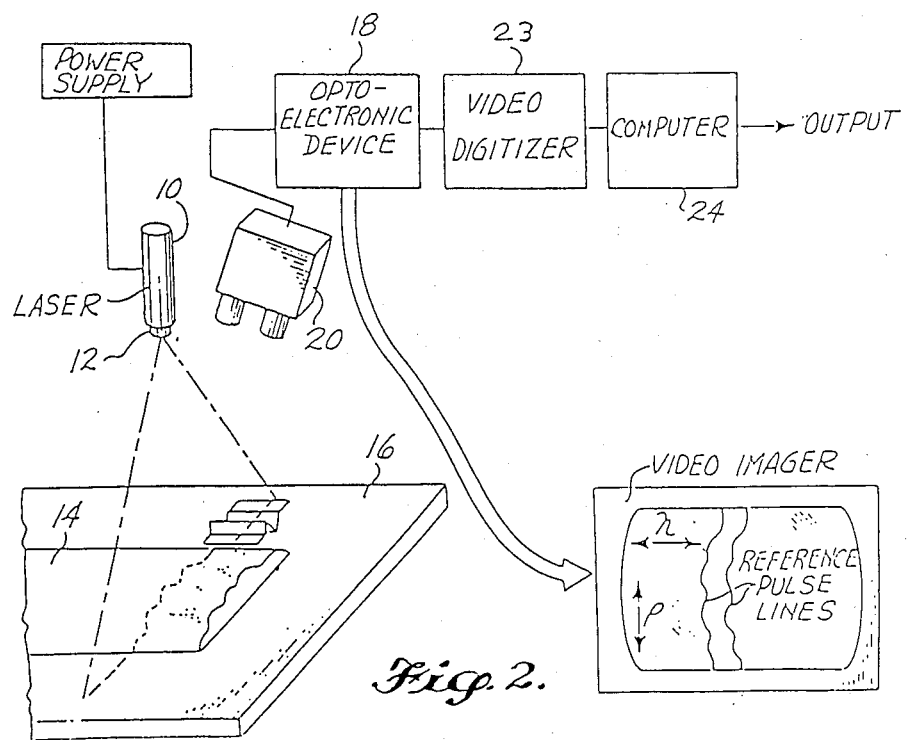
FIG. 2 is a block diagram of another embodiment of a typical apparatus for determining the spatial coordinates of a workpiece employing a camera having a pair of viewing apertures.
Figure 3:
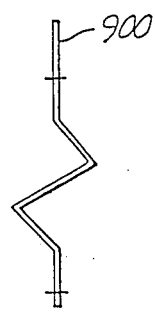
FIG. 3 is a side view of a typical calibration jig.

An alternate embodiment of the present invention is shown generally in FIG. 2. The laser scanner generates a source of coherent light and illuminates the workpiece as has been described above. An optical head, having two separate, spaced-apart viewing apertures, views the workpiece to produce dual images of the workpiece. Within the optical head, dual images are formed and viewed by the image orthicon and a pair of reference pulses are produced on each scan line which pulses correspond to the points at which the scan line intersects the plane of coherent light impinging upon and illuminating the workpiece. The result is a pair of reference pulse lines such as those shown on the video imager in FIG. 2. As has been described, one or more video digitizers again sample and digitize each scan line, including both of the reference pulses. The subsequent digitized information is again used to determine with great accuracy the location of the centroid or geometric mean of the pulses and this information is used in conjunction with known and calculated parameters to determine the spatial coordinates of the workpiece in a manner similar to that to be described hereafter with respect to the apparatus of FIG. 1.

It should be understood that the video imagers shown in both FIGS. 1 and 2 do not form part of the apparatus for practicing the present invention but merely illustrate the forms of the electronic signals upon which the video digitizer operates if visualized.

Referring again to FIG. 1, the laser 10 is shown separate and apart from the remaining elements of the apparatus and need have no hardware interface with the remaining elements of the present invention except possibly when used with an angle sensor for the laser beam to calculate the X coordinate in swept laser applications. The laser positioned above the workpiece generates a point source of coherent light which is converted into a plane of coherent light by an optical attachment 12 of known type associated with the output of the laser. It will be understood that other types of light sources may be used in the practice of this invention but that use of a laser is preferred due to the reduction of the scattering effects of ambient light. The plane of coherent light is directed at, and illuminates, the workpiece 14 whose spatial coordinates are to be determined. As illustrated, the workpiece is shown on a portion of a conveyor 16 or the like. In the preferred embodiment, the laser 10 is nonmovable, but in an alternate embodiment of the present invention, the laser may be mounted so as to scan the workpiece in a side-to-side fashion.

The lens of the opto-electronic device 18 associated with the apparatus of FIG. 1 is of a conventional type selected to obtain a usable field of view of the workpiece and thus may be varied depending upon the job being performed. While not shown, a laser interference filter may be mounted between the lens and the opto-electronic device to filter out ambient light. Dual optical head 20 of FIG. 2 comprises a binocular lens system, again selected to obtain a usable field of view.

The opto-electronic device of FIG. 1 may be a standard closed-circuit television camera generating a plurality of scan lines per raster in a left to right sweep pattern. The camera can be either a high- or a low-resolution camera with high or low light-sensing capabilities as needed for the particular work situation. Each scan line includes a reference pulse corresponding to the point at which the scan line intersects the plane of coherent light illuminating the workpiece to produce an output of the type illustrated on the video imager in FIG. 1.

Figure 11:
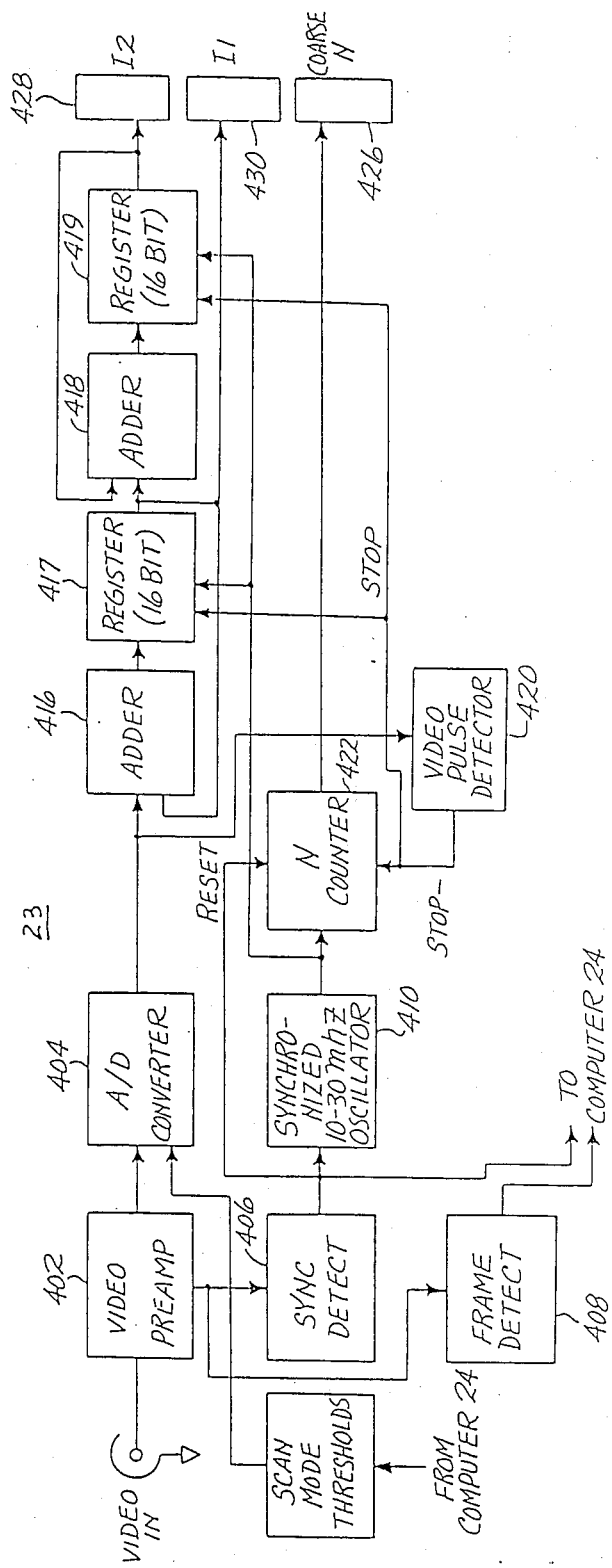
FIG. 11 is a block diagram of a video digitizer for determining the centroid of the pulse in accordance with the present invention.

The video digitizer 23, shown as a labeled box in FIGS. 1 and 2 and in detail in FIG. 11, is in communication with the output of the opto-electronic device 18 and, in general, samples and digitizes the analog output signal produced by it. After each sweep line from the image orthicon has been sampled, digital logic circuitry within the video digitizer is used to determine the centroid of each reference pulse in a manner to be described below. The output of the video digitizer is used by a computer 24 shown schematically in FIG. 1 as a plurality of boxes labeled with the various key functions performed by the computer. The computer takes the video digitizer output and linearizes it, that is, it mathematically compensates for the nonlinearity of the laser line, camera lens, and camera electronics. It will be understood that this function is likely necessary only when the camera system used produces a nonlinear image which will affect results. The use of high-quality camera and laser lenses may avoid the need for linearization while the use of very low-quality lenses may effectively prevent correction.

The digitizer output signals are then combined with calibration parameters to calculate the spatial coordinates of the workpiece. The calibration parameters are first calculated by electronically viewing and scanning the image of the intersection of the light source with a precisely formed jig, selecting scanned points along planar surfaces of the jig and forming intersecting lines through those points. The intersections of the lines thus formed define the corners of a geometric figure inherent to the jig, such as a triangle, and the dimensions, such as the base and height, are stored within the computer. By combining the geometric figure formed by scanning the jig with the stored dimensions of the figure, calibration parameters are calculated to accurately fix points thereafter scanned on a workpiece as will be described hereafter. The calibration parameters may be determined intermittently between calculations of the spatial coordinates of the workpiece.

A significant advantage and improvement provided by the present invention arises due to the vastly improved accuracy with which the present equipment allows the location of the reference pulse to be determined. Typical video signal bandwidths, such as those used in television broadcasting, allow for a horizontal resolution of approximately 300–500 picture elements. The present apparatus and method offer much higher resolution with potential usable resolution of one part in 20,000 up to one part in more than one million.

As stated heretofore, the center of a reference pulse produced by the opto-electronic device is determined by a centroid technique comprising the steps of singly and doubly integrating the samples representative of the pulse, i.e., summing all samples representative of the pulse for the single integration and summing all intermediate sums of the single integration for the double integration, dividing the value obtained by the double integration by the value obtained by the single integration to arrive at an offset which is subtracted from the location of the last pulse sample to arrive at the centroid of the pulse. In the present system, the computer portion of the equipment provides a predetermined threshold to the digitizer to fix the limits of integration of the pulse. The video digitizer samples the video signal and generates digital signals representative of the magnitude of the samples.

The centroid technique of the present invention is also disclosed along with a related pulse integration technique in above-mentioned application Ser. No. 426,840. In both pulse locating methods, the use of linear interpolation, or possibly polynomial or curvilinear interpolation, allows the pulse mean to be fixed to any reasonably desired precision with the primary limitation being the resolution of the amplitude measurement and the number of samples taken. Either method can be implemented using either analog circuitry, a bit-slice processor, a processor algorithm embodied in software, or digital circuitry; however, the digital circuitry implementation appears to be the most practical solution to the problem at the present time.

Referring now to FIG. 11, a block diagram of the centroid technique of the present invention is performed by video digitizer 23. A video signal is fed to a preamplifier section 402 which conditions and buffers the incoming signal for the A/D converter 404. Derived also from this incoming signal is the sync pulse at the start of each line of video as well as the frame (blanking) pulse at the beginning (top) of the screen. These are derived respectively by a sync detect circuit 406 and a frame detect circuit 408. These pulses are fed to the computer 24 so it can determine line numbers $p$ scanned by the opto-electronic device 18. An oscillator 410 receives and is synchronized to the sync pulses generated by the sync detector 406 so that the oscillator output signal can then be used for all of the video signal sampling as well as the logic timing within the video digitizer 23.

The A/D converter 404 samples the buffered video signal from the video preamplifier 402 and converts the video samples into binary (digital) data. The adder circuit 416 sums each sample which is taken after a sample has exceeded a threshold set by the computer 24. The system continues sampling and summing (integrating) each sample until a sample drops below the set threshold. A second sum is generated by the adder circuit 418 from the successive intermediate sums formed by the adder circuit 416.

As the samples are taken, a counter 422 counts pulses from the oscillator 410. Each pulse from the oscillator 410, and thus the count N contained in the counter 422, corresponds to a video sample. The N counts or numbers contained in the counter 422 also define the location along a given raster scan line at which the corresponding sample was taken. Again, higher precision and resolution are obtained if higher oscillator frequencies are used.

After all samples representative of a pulse have been received, the sum of those samples is stored in the first adder circuit 416. The associated output register 417 contains a first sum representing the accumulated sum $\Sigma$ of all the pulse samples, i.e., all samples representative of the pulse from a first sample to a last sample. The second adder 418 and its associated output register 419 contain a second sum representing the sum of the intermediate sums of the pulse samples, thus providing the double or successive integral of the pulse samples. After the summation of all pulse samples, the summing and counting sequence is halted. Three values are stored: the count contained in the counter 422 is stored in the COARSE N register 426; the value in the second integrating register 419 is stored in the I2 register 428; and the value in the first integrating register 417 is stored in the I1 register 430. These three numbers are then used to generate the centroid $\eta$ of each scan pulse by utilization of the equation:

$$\eta = N - \frac{I2}{I1},$$

wherein the factor I2/I1 represents the above-mentioned second sum divided by the above first sum and represents an amount prior to the last sample at the coarse N, at which the centroid is located.

In the present device, and in other devices which require precise location of a pulse, the classic centroid equation can be used. The continuous form of the centroid equation for a pulse with the amplitude function f(t) is:

$$\frac{\int_0^T tf(t)}{\int_0^T f(t)}$$

In a discrete system, the analog to the above equation is:

$$C = \frac{\sum_{i=0}^{N} if_i}{\sum_{i=0}^{N} f_i}$$

This approach has been found to produce results significantly superior to the previously mentioned pulse integration technique for pulses with relatively few samples. The only problem with using this technique stems from the difficulty of generating the $if_i$ product term with the same speed and economy provided by the pulse integration technique. This problem has been solved by reformulating the centroid equation such that multiplication operations are avoided, thus providing significant savings in both speed and costs. The manner of this reformulation will now be described with reference to the array of data disclosed in FIG. 12. This array has three characteristics:

(1) The sum of all array members is:

$$(n + 1) \sum_{i=0}^{n} f_i$$

(2) The sum of all the terms under the diagonal is:

$$\sum_{i=0}^{n} if_i$$

(3) The sum of all the terms above the diagonal is:

$$\sum_{i=0}^{n} \sum_{j=0}^{i} f_j$$

Thus:

$$(n + 1) \sum_{i=0}^{n} f_i = \sum_{i=0}^{n} if_i + \sum_{i=0}^{n} \sum_{j=0}^{i} f_j$$

Or, $$\sum_{i=0}^{n} if_i = (n + 1) \sum_{i=0}^{n} f_i - \sum_{i=0}^{n} \sum_{j=0}^{i} f_j$$

Thus, the centroid equation can be rewritten as follows:

$$C = \frac{\sum_{i=0}^{n} if_i}{\sum_{i=0}^{n} f_i} = (n + 1) - \frac{\sum_{i=0}^{n} \sum_{j=0}^{i} f_j}{\sum_{i=0}^{n} f_i}$$

Figure 12:
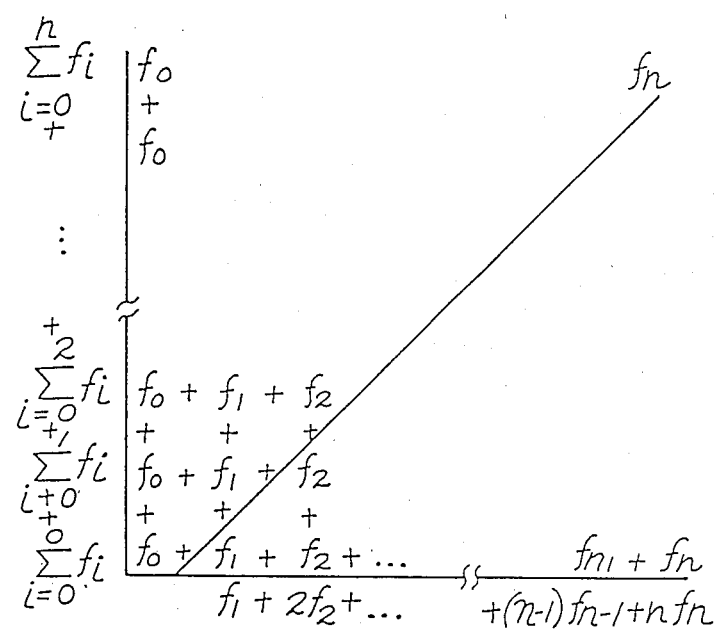
FIG. 12 is a chart showing an array of data representative of a digitized pulse and illustrating the method of determining the pulse centroid.

The calculation $$\sum_{i=0}^{n} f_i$$

is performed, summing samples across the pulse, and thus each term of the portion of the array in FIG. 12 above the diagonal is available from the first adder 417 which is stored in the I1 register 430. These, then, need only be summed to arrive at the $$\sum_{i=0}^{n}\sum_{j=0}^{i} f_j$$

terms, which terms are available from the second adder 419 stored in the I2 register 428. Thus, two relatively inexpensive adders can provide all of the on-line, sample to sample, calculation. The terms $$\sum_{i=0}^{n}\sum_{j=0}^{i} f_j \text{ and } \sum_{i=0}^{n} f_i$$

can then be divided after the sample interval to arrive at the pulse centroid.

Once the centroid of each reference pulse is determined to the desired degree of resolution by video digitizer 23, the computer portion of the equipment relates this centroid information to known parameters such as the distance from the optical head to the jig to calculate the spatial coordinates of the workpiece.

In determining the necessary parameters for calibration, a precisely formed jig 900 such as one of those shown in FIGS. 3 through 10 is used as a calculating reference base rather than stored spatial coordinates as has been used by the prior art. Scanned image lines form reference pulse centers 901 along planar surfaces of a jig and straight lines 902 are constructed through these selected scanned points (pulse centers 901) as shown in FIGS. 7–10. The intersection points 904 of the lines thus constructed define corners of a geometric figure such as triangle 905 shown in FIGS. 8 and 9. Appropriate dimensions of the figure thus constructed, e.g., the base and height of the triangle, are stored in the computer. It is noted that the spatial coordinates of the corner points 904 are not known by the computer and that the corner points need not and, in the preferred form of the jig, do not lie upon the surface of the jig as seen in FIGS. 7 through 10.

The jig 900 shown in FIGS. 7 and 8 is the preferred form of jig because of its low cost, ease of formation and self-cleaning nature. The slot 908 formed in the jig 900 of FIGS. 7 and 8 permits sawdust, small wood chips and other debris to fall through the jig so that the planar surfaces to be scanned tend to remain cleaner than with other jig forms. Further, the jig 900 of FIGS. 7 and 8 can be easily and cheaply formed into the workpiece-supporting surface, i.e., the upper surface of the conveyor 16 as disclosed, so as to be located completely below the planar surface of workpiece support conveyor 16 without obstructing the surface, and with open slot 908 extending through the support 16. Such formation into the workpiece support surface also insures highly accurate location of the jig relative to the workpiece support to simplify calculations and improve accuracy.

The geometric figure inherent to the jig and constructed by the computer from information obtained by scanning the jig is compared to the dimensions of the figure stored in the computer. One of the corner points of the geometric figure is established as a 0,0,0 point or origin of a three-dimensional coordinate system. The position of the coordinate system origin, i.e., the selected corner point, relative to the conveyor 16 is determined and passed to the computer 24 to accurately locate points on the surface of the workpiece in the coordinate system. Of course, if the jig is formed into the surface of the workpiece support, e.g., the conveyor 16, this position is fixed and preprogrammed into the computer. One or more other corner points of the geometric figure are defined in the coordinate system. These defined points in the coordinate system, including the origin, permit the calculation of calibration parameters set out in equations hereafter.

In this unique way, the accuracy of the present equipment is significantly improved as compared to prior equipment which necessarily are limited in resolution power to stored spatial coordinates of a jig. In accordance with the present invention, regardless of where the optical scanner is aimed, so long as a jig is in the field of view of the camera, calibration will be consistent. It is suggested that the longitudinal axis of the jig be aligned with the longitudinal axis of the conveyor 16 to simplify calculation of the spatial coordinates of the workpiece, however, such alignment is not necessary.

The calibration technique is employed to calculate four parameters for the (YZ) calculation. The equations for calculation of the Y and Z spatial coordinates of points on the workpiece are:

$$Z = Z_0 \frac{\eta - \eta_0}{\eta - \eta_\infty}$$

$$Y = K_1(\rho - \rho')(Z_0 - Z) - K_2$$

And the calculation of the X spatial coordinate is:

$$X = Z \tan \beta$$

Where $\eta_0$, $\eta_\infty$, $K_1$, $K_2$ and $\rho'$ are parameters calculated during calibration, $\eta$ and $\rho$ are the parameters passed to the computer by the digitizer, $Z_0$ is a constant equal to the known distance from the camera to the calibration jig and $\beta$ is the known angle of the laser to the camera. By using the stored dimensions of the geometric figure of a precisely formed calibration jig and the video digitizer to find centers of reference pulses representing sample data points on planar surfaces of the jig, defined points in a three-dimensional coordinate system can be determined as previously described. The four parameters ($\eta_0$, $\eta_\infty$, $K_1$, and $K_2$) can be determined with excellent accuracy by inverting the above equations and utilizing the known locations of the corner points of the geometric figure to solve the inverted equations for the parameters.

Figure 4:
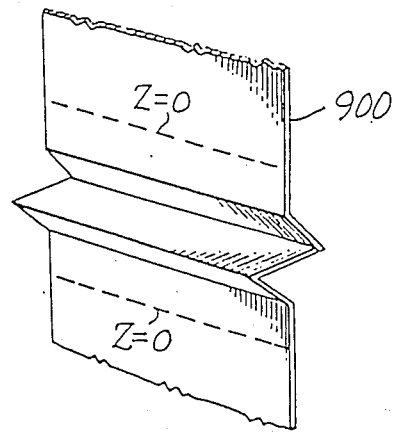
FIG. 4 is a perspective view of the jig of FIG. 3.
Figure 5:
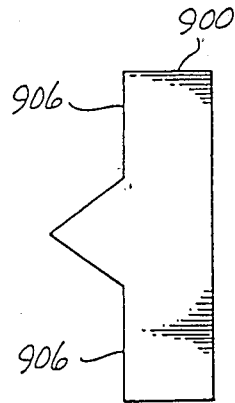
FIG. 5 is a side view of another embodiment of a calibration jig.
Figure 6:
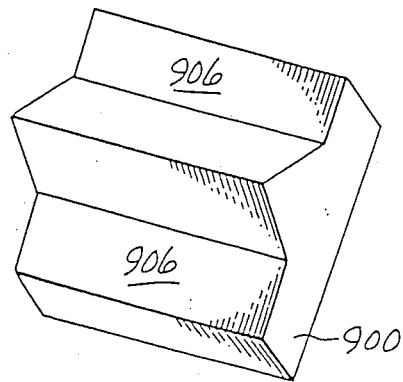
FIG. 6 is a perspective view of the jig of FIG. 5.

Referring to FIGS. 7 through 10, in use, the computer is instructed as to locations of Z=zero portions 906 of the jigs shown (also shown by dashed lines in the jig of FIG. 4). This allows the system to choose sample points on the planar surfaces of the jig. Two or more sample points 901 are selected at locations on planar surfaces of the jig, i.e., locations other than where the planar surfaces intersect, and lines 902 are constructed through these points by the computer. The intersections 904 of the lines 902 constructed through the selected points 901 are determined and compared to stored dimensions of the specific geometric figure formed by visualizing those points as the corner points of the figure. A coordinate system is established based on one of the corner points and the remaining corner points are accurately defined within the coordinate system. These known points in the coordinate system, including the origin of the coordinate system are then used to calculate $\eta_0$, $\eta_\infty$, $K_1$ and $K_2$ by inverting the Y and Z equations set forth above and solving the resulting equations simultaneously. In this way, the present equipment is calibrated without storing the spatial coordinates of points on a jig surface. The four parameters can be determined periodically or on a continuing basis in the manner discussed above.

A novel and unique method and apparatus for determining the centroids of reference pulses in a system for locating a workpiece with speed and accuracy not heretofore known has thus been disclosed. It will be apparent to those skilled in the art to which this invention is addressed, however, that the present invention may be embodied in forms or embodiments other than that specifically disclosed above without departing from the spirit or essential characteristics of the invention. The particular embodiment of the high-speed scanning apparatus described above is therefore to be considered in all respects as illustrative and not restrictive and the scope of the present invention is set forth in the appended claims rather than being limited by the examples set forth in the foregoing description.

What is claimed is:

1. In a method for determining spatial coordinates of a workpiece, the steps comprising:
   (a) illuminating said workpiece with a planar source of light;
   (b) electronically viewing the intersections of the planar source of light and said workpiece from a known location spaced apart from said workpiece;
   (c) scanning electronic images formed by said electronic viewing along a plurality of scan lines, in which the scanning of each line produces a reference pulse corresponding to the location at which the planar light intersects said workpiece;
   (d) determining the centroid of the reference pulse on at least one of said scan lines by the substeps of:
      (i) sampling a pulse signal representing said reference pulse;
      (ii) digitizing said samples to generate digital values representative of the magnitude of said pulse samples;
      (iii) performing a first integration by sequentially adding said digital values to produce a first sum signal;
      (iv) performing a second integration by adding intermediate sums associated with said substep of sequentially adding said digital values to produce a second sum signal; and
      (v) dividing said second sum signal by said first sum signal to produce an offset distance representing an offset distance by which the centroid of said pulse signal precedes the location at which the last sample of said pulse signal was taken; and
   (e) calculating the spatial coordinates of said point on the workpiece using the centroid of said reference pulse and said known location of said step of electronic viewing.

2. The method of claim 1, wherein said substeps of performing said first and second integrations are carried out by digital adders.

3. In a method for determining spatial coordinates of a workpiece, the steps comprising:
   (a) illuminating said workpiece with a planar source of light;
   (b) electronically viewing the intersections of the planar source of light and said workpiece from a known location spaced apart from said workpiece;
   (c) scanning electronic images formed by said electronic viewing along a plurality of scan lines, in which the scanning of each line produces a reference pulse corresponding to the location at which the planar light intersects said workpiece;
   (d) determining the centroid of the reference pulse on at least one of said scan lines by the substeps of:
      (i) electronically sensing said reference pulse to produce a signal representative of said reference pulse;
      (ii) integrating the reference pulse signal by means of an analog integrator over a preselected signal interval including the reference pulse to produce an analog first sum signal;
      (iii) integrating said first sum signal by means of an analog integrator to produce an analog second sum signal; and
      (iv) dividing said second sum signal by said first sum signal to produce a centroid location signal linearly proportional to the distance in time from the end of said preselected signal interval to the centroid of said reference pulse.

4. In an apparatus for determining spatial coordinates of a workpiece, the combination comprising:
   (a) means for illuminating said workpiece with a planar source of light;
   (b) means for electronically viewing the intersections of the planar source of light and said workpiece from a known location spaced apart from said workpiece;
   (c) means for scanning electronic images formed by said electronic viewing along a plurality of scan lines, in which the scanning of each line produces a reference pulse corresponding to the location at which the planar light intersects said workpiece;
   (d) means for determining the centroid of the reference pulse on at least one of said scan lines comprising the subcombination of:
      (i) means for sampling a pulse signal representing said reference pulse;
      (ii) means for digitizing said samples to generate digital values representative of the magnitude of said pulse samples;
      (iii) means for performing a first integration by sequentially adding said digital values to produce a first sum signal;
      (iv) means for performing a second integration by adding intermediate sums associated with said means for performing said first integration to produce a second sum signal; and
      (v) means for dividing said second sum signal by said first sum signal to produce an offset distance signal representing an offset distance by which the centroid of said pulse signal precedes the location at which the last sample of said pulse signal was taken; and
   (e) means for calculating the spatial coordinates of said point on the workpiece using the centroid of said reference pulse and said known location of said means for electronic viewing.

5. In the apparatus of claim 4, said means for performing said first and second integrations comprising digital adders.

* * * * *